Oct. 28, 1958 N. B. BLAKE 2,858,510

FREQUENCY MODULATION SYSTEM

Filed June 14, 1952

*INVENTOR.*

NORMAN B. BLAKE

*BY* Busser, Smith & Harding

ATTORNEYS 2,858,510
Patented Oct. 28, 1958

2,858,510

FREQUENCY MODULATION SYSTEM

Norman B. Blake, Beaumont, Tex., assignor to Sun Oil Company, Philadelphia, Pa., a corporation of New Jersey Application June 14, 1952, Serial No. 293,512

2 Claims. (Cl. 332—14)

This invention relates to a frequency modulation system and has particular reference to a system having the advantages of compactness, small number of component parts, relatively low voltage power equipment, exceptionally high frequency swing, high linearity of transfer characteristic, low phase shift of modulation envelope, low amplitude modulation and great stability. While the system is of quite general applicability, it is particularly adapted for the modulation of a carrier by seismic signals for the purpose of magnetic recording.

The general objects of the present invention relate to the provision of a modulation system having the advantageous characteristics indicated above. These general objects together with subsidary objects particularly relating to details of construction and operation will be apparent from the following description read in conjunction with the accompanying drawing in which.

Figure 1:
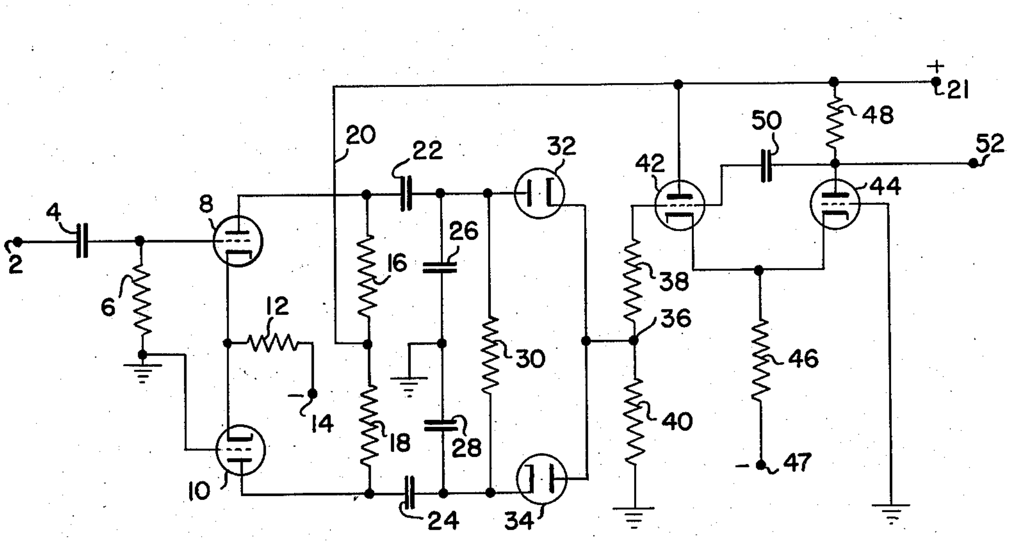
Figure 1 is a wiring diagram showing a preferred embodiment of the modulation system.

Referring first to Figure 1, an input terminal at 2 receives the low frequency signals which are to modulate a higher frequency carrier, these signals, in general, being subjected to preamplification prior to the terminal 2. By such amplification the signals are raised to a sufficient level to secure the amount of modulation required.

The signals are fed from the terminal 2 through condenser 4 to an amplifier-inverter comprising the triodes 8 and 10 with the resistor 6 connected between their grids and having its lower end grounded. Bias is provided by the connection of the joined cathodes of these triodes through a resistor 12 to a negative potential source 14. The anodes of triodes 8 and 10 are joined by the series arrangement of resistors 16 and 18, the junction of which is connected at 20 to a high voltage positive supply terminal 21. To give an idea of the low supply voltages required for the present system, the potential of terminal 21 may typically be 90 volts, while the bias at terminal 14 and also at terminal 47 hereafter described may be 6 volts.

The portion of the circuit just described constitutes a conventional amplifier-inverter and further description of its operation is therefore unnecessary. A transformer may be used, if desired, to provide a push-pull signal instead of the inverter. The output is delivered through condensers 22 and 24 which desirably have high capacity values, for example 1 microfarad each. On the output side of these condensers there are connected the small condensers 26 and 28 running to ground and providing bypass for high frequency components originating in the oscillator portion of the circuit. Fed by the condensers 22 and 24 is a resistance 30, the illustrated upper end of which is connected to the anode of a diode 32 while its lower illustrated end is connected to the cathode of a diode 34. The cathode of diode 32 is connected to the anode of diode 34 and to the junction 36 of a pair of resistors 38 and 40 arranged in series between the grid of a triode 42 and ground.

Triode 42 is associated with a second triode 44 in a conventional astable multivibrator circuit. The cathodes of these triodes are joined and connected through resistance 46 to the negative bias terminal 47. The grid of the triode 44 is grounded. The anode of triode 44 is provided with load resistor 48 extending to the positive supply terminal 21. The anode of triode 42 is directly connected to this terminal. The anode of triode 44 is connected through condenser 50 of suitable capacity value to the grid of triode 42. The output is delivered to terminal 52 from the anode of triode 44, and this output may be further amplified, subjected to frequency multiplication, or the like, as desired.

The operation of the circuit may now be described as follows:

Considering first the multivibrator, this involves as usual the output of a substantially rectangular wave from the anode of triode 44 at the frequency which is essentially determined by the capacity of condenser 50 and the effective grid leak resistance at the grid of triode 42. In the present instance the capacity at 50 is fixed and chosen to secure the desired mean frequency of the oscillator. As will presently appear the frequency is then determined by variations of the current in the grid leak resistor.

Figure 2:
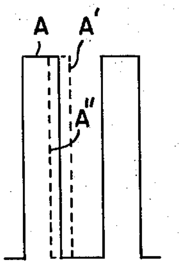
Figure 2 is a diagram illustrating swings of anode potential of one of the tubes of an astable multivibrator involved in the system.
Figure 3:
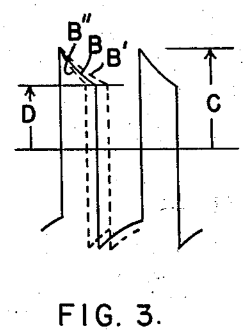
Figure 3 is a similar diagram showing the swings of control grid potential of the companion tube of the multivibrator.

Considering now the action of the amplifier-inverter, this provides across the resistance 30 a potential which corresponds to the audio input signal at terminal 2. Since the circuit is balanced the center of resistor 30 is at ground potential and the upper and lower terminals of this resistor are constantly at opposite potentials corresponding to the input signal. In addition there is a bias developed across resistor 30 by the rectifying action of the diodes 32 and 34 on the carrier signal present at junction 36. The upper end of resistor 30 is biased negatively and the lower end positively. Reference may now be made particularly to Figures 2, 3 and 4. In Figure 2 there is indicated at A the substantially rectangular wave which appears at the anode of triode 44. This wave is applied through condenser 50 to the grid of triode 42 and there appears as the wave indicated at B in Figure 3. At the time of transition of the multivibrator from one of its states to the other, a peak potential is applied to the grid of triode 42 in a direction corresponding to the excursion of potential of the anode of triode 44. During each flat top of the wave A, the condenser 50 discharges so that the potential of the grid of triode 42 falls along an exponential toward the voltage determined by diode 32 or 34, whichever is conducting. The time required for this exponential decay of potential depends upon the capacity of the condenser 50 and the rate of its discharge as determined by the current which may flow through the grid resistor 38. When the exponential drop reaches a value D substantially less than the peak value of the grid excursions C, the multivibrator shifts to its alternative state and this action continues to repeat thus giving rise to its high frequency output. The frequency depends upon the time required for the grid potential to fall from its maximum C to its value D.

Figure 4:
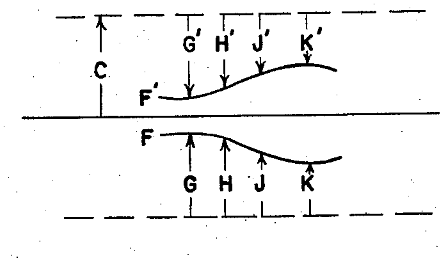
Figure 4 is a diagram illustrating the nature of the modulation involved.

In the present circuit the resistances 38 and 40 are fixed, but the current which flows in resistance 38 is controlled, not by the resistance value thereof, but by variation of the potential appearing at the terminal 36. This potential varies with the modulating potential appearing across resistor 30 as follows:

Since, in general, the output of the multivibrator will have a frequency greatly exceeding the frequency of the modulating potential, it may well be assumed that at least for a plurality of high frequency oscillations the modulating potential appearing across resistor 30 is constant. Referring to Figure 4, the modulating potential is there diagrammed as a sinusoidal wave superimposed on the bias so that F may be taken to represent the potential at the upper end of resistor 30 and F′ may be taken to represent the potential at the lower end of this resistor. The amplitudes of the curves F and F′ must not only be less than C, the maximum amplitude of the excursions of the grid of triode 42, but also less than the critical potential D which determines the transition of the multivibrator from one state to the other. Under these conditions attention may be directed to the time at the abscissa of the arrow G in Figure 4.

Consider first the situation which arises when the grid of triode 42 is driven to its peak positive value C. This potential will appear at the upper end of resistance 38. At this time the upper and lower ends of resistance 30 will have the potentials indicated by the values of curves F and F′ at the abscissa under consideration. The potential at the upper end of resistance 38 exceeds the potential at the upper end of resistor 30 and consequently diode 32 is not conducting. On the other hand, the lower end of resistor 30 has a smaller positive value on curve F′, and diode 34 is therefore conductive and in comparison with resistance 38 offers a low resistance. Current then flows to effect discharge of condenser 50 at a rate equal to the instantaneous potential at the grid of triode 42 minus the potential appearing at 36, which is approximately the potential at the lower end of resistor 30, this difference being divided by the actual value of resistance 38. The time required for the exponential drop of potential of the grid of triode 42 to the value D is thus determined by the potential at the lower end of resistor 30.

A similar situation exists during negative excursions of the grid of triode 42. Under these circumstances the diode 34 is non-conducting, and the potential drop determining the current through resistance 38 is between the negative potential of the grid of triode 42 and the potential at the upper end of resistor 30.

The potential drops determining the respective current flows through resistance 38 at the times of maximum positive and negative potential of the grid of triode 42 are indicated at G′ and G for the abscissa under consideration. When the currents thus flowing are large, due to the fact that the potential at the upper end of resistor 30 is low negatively and the potential at its lower end is correspondingly low positively, the time of decay of the current is short so that the exponential drop is along a curve such as B″ in Figure 3 giving rise to a higher frequency of output of the multivibrator. It may be noted that with proper choice of circuit constants the exponential drops at the positive and negative excursions of the grid may be made to have essentially the same effective time constants so that the output of the multivibrator will be substantially symmetrical, with positive and negative excursions of the output wave of substantially equal duration. The drop of potential at the anode of triode 44 corresponding to the exponential at B″ is indicated at A″.

As the value of the modulation potential changes in the direction of a more positive value at the lower end of resistor 30 conditions are changed to those indicated at H and H′, and the frequency of the multivibrator output is correspondingly decreased. When the potential at the lower end of resistor 30 goes further positively, conditions will be as indicated at J and J′, with still further decrease of frequency, while as the modulation potential approaches a peak as at K and K′ the frequency of output approaches a minimum, the exponential being then, for example, as indicated at B′, and the drop of anode potential of triode 44 being as indicated at A′.

It can be shown that the transfer characteristic is closely linear, i. e. that the changes of frequency on both sides of the mean frequency are approximately equal for given positive and negative potential changes in the modulating signal. Within the above described region of proper operation, residual non-linearity appears in the demodulated signal principally as a second harmonic having a magnitude which, under typical conditions, is less than 2% of the fundamental modulating frequency.

Little amplitude modulation occurs, since the excursions of the anode potential of triode 44 are determined by the constants of the multivibrator circuit and the amplitude is little affected by the modulating potential.

Particularly in seismographic applications, it is desirable that there should be minimized phase shift of the modulation envelope since phasing is of particular significance and should be preserved through a modulating system. In the case of the circuit described, there is very little shift of the modulation envelope. In order to pass the low frequencies with little phase shift condenser 4 and resistor 6 are chosen large and also condensers 22 and 24 are chosen large. To minimize the phase shift at higher frequencies tubes 8 and 10 are selected to have low plate resistance so that the shunting effect on the modulating signal of condensers 26 and 28 will be small.

A large frequency swing is also possible so long as the modulating potential appearing across the resistor 30 has an amplitude less than that of the critical transition potential D of the multivibrator.

The modulating system may be made quite small and compact inasmuch as the pairs of triodes and diodes may be constituted by the assemblies of dual-type tubes, so that a total of only three tubes will be required. In fact the diodes may be of crystal type, still further reducing the bulk of the apparatus.

It will be evident that certain variations, particularly in the matter of direct current connections may be made without affecting the operation, for example the center of resistor 30 may be grounded if desired, and other conventional connections may be made in or to the multivibrator in accordance with well known practices. It is to be understood therefore that the invention is not to be regarded as limited except as required by the appended claims.

What is claimed is:

1. A frequency modulation system comprising an astable multivibrator having a capacity-resistance arrangement, the effective time constant of which determines the durations of both states of said multivibrator, said states being approximately of equal duration, and modulating means comprising an impedance, means providing a modulating potential across said impedance, and a pair of diodes, one having its anode conductively connected to one terminal of said impedance and the other having its cathode connected conductively to the other terminal of said impedance, the cathode of the first mentioned diode being connected conductively to the anode of the second mentioned diode and conductively to a point of said capacity-resistance arrangement to produce a variation of said effective time constant in accordance with said modulating potential so that one state of said multivibrator provides a potential causing conduction of one of said diodes, and the other state of said multivibrator provides a potential causing conduction of the other of said diodes.

2. A frequency modulation system comprising an astable multivibrator including a pair of thermionic tube assemblies each comprising cathode, anode and grid elements with the anode of the first assembly coupled through a condenser to the grid of the second assembly and with one terminal of a resistance connected to the last mentioned grid, and modulating means comprising an impedance, means providing a modulating potential across said impedance, and a pair of diodes, one having its anode conductively connected to one terminal of said impedance and the other having its cathode connected conductively to the other terminal of said impedance, the cathode of the first mentioned diode being connected conductively to the anode of the second mentioned diode and conductively to another terminal of said resistance to produce a variation of the effective time constant of the condenser-resistance combination in accordance with said modulating potential so that one state of said multivibrator provides a potential causing conduction of one of said diodes, and the other state of said multivibrator provides a potential causing conduction of the other of said diodes.

References Cited in the file of this patent

UNITED STATES PATENTS

| | | |
|---|---|---|
| 2,226,459 | Bingley | Dec. 24, 1940 |
| 2,438,950 | Smith | Apr. 6, 1948 |
| 2,456,089 | Shenk et al. | Dec. 14, 1948 |
| 2,515,271 | Smith et al. | July 18, 1950 |
| 2,610,298 | Zaloudek | Sept. 9, 1952 |
| 2,610,318 | Clark | Sept. 9, 1952 |